July 29, 1924.
W. D'A. RYAN
1,502,684
HOUSING FOR HEADLIGHTS
Filed July 24, 1922
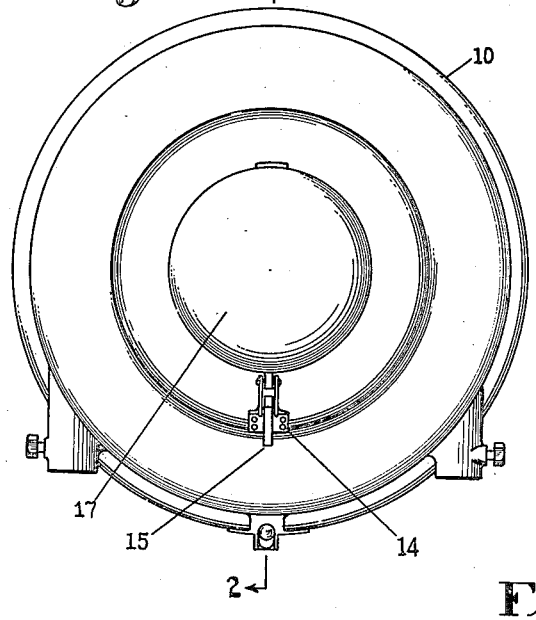
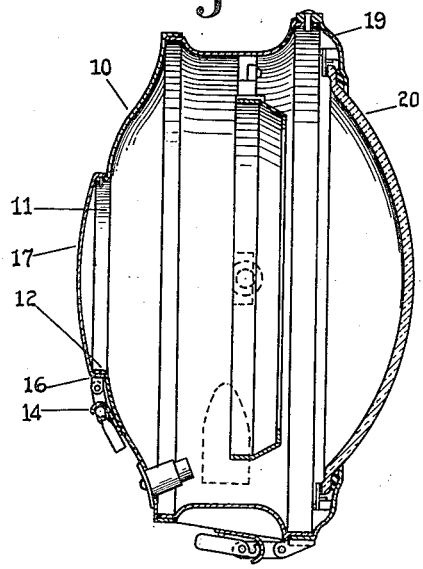
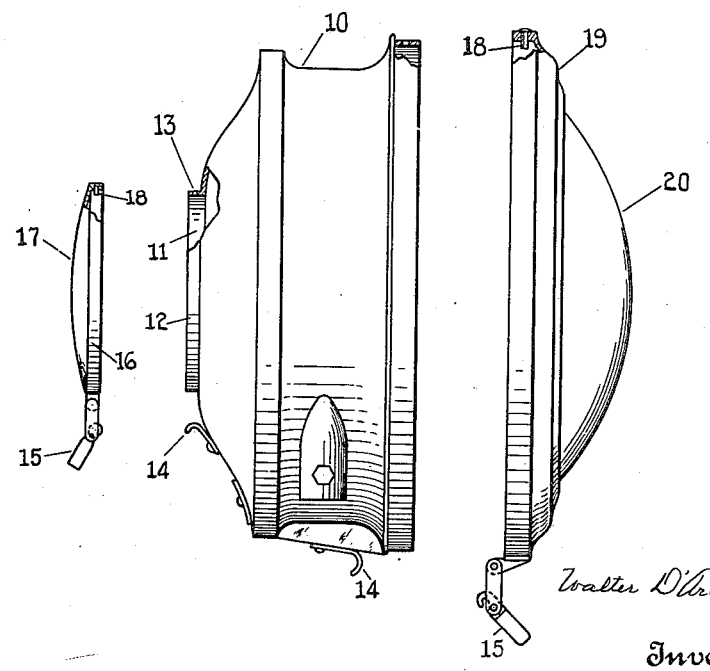
Walter D'Arcy Ryan
Inventor
By his Attorneys Dodson & Roe Patented July 29, 1924.

1,502,684

UNITED STATES PATENT OFFICE.

WALTER D'ARCY RYAN, OF SCHENECTADY, NEW YORK.

HOUSING FOR HEADLIGHTS.

Application filed July 24, 1922. Serial No. 576,913.

*To all whom it may concern:*

Be it known that I, WALTER D'ARCY RYAN, a citizen of the United States, residing at Schenectady, in the county of Schenectady and State of New York, have invented a new and useful Improvement in Housings for Headlights, of which the following is a specification.

My invention relates to the art of constructing headlights and has for its object to construct a housing to enclose the functioning parts, which may be easily and quickly opened so that an electrician or mechanic may have ready access to the same. A further object is to provide such openings at the most convenient places and make them sufficiently large to provide ample space for working in the housing. A further object is to provide doors for these openings, mounted in such a way that they may be entirely detached from the housing, and yet when in place and locked will be tight fitting and practically dust proof.

I accomplish my objects in the manner shown and described herein, in which reference will be made to the drawings in which—

Fig. 1 is a rear view;

Fig. 2 is a cross section side elevation view;

Fig. 3 is a disassembled side elevation view.

Referring to the accompanying drawings, the reference numeral 10 is used to indicate a headlight housing in which the reflector and light source are designed to be secured. In the rear of the housing I have formed an opening 11, preferably circular in conformation, surrounded by an outwardly projecting flange 12, an orifice 13 being formed through the same, preferably, at its upper extremity. A lock lug 14 is secured to the housing in proper juxtaposition to a lock lever 15 which is secured to the mating flange 16 of a closure, or door, 17. The flange 16 mates with, by closely surrounding when the door is in closed position, the flange 12 and a lug, or projection, 18 extends inwardly from the flange 16 and is mounted to engage and be seated in the orifice 13.

The front of my housing is provided with a flange rim 19, in which is secured a glass front 20, the flange rim being provided with a surrounding flange to surround a companion flange on the housing, the orifice and mating lug, and the lock lug and lock lever being also provided for these mating parts as hereinbefore described for the door in the rear part of the casing.

The lock levers 15 are pivotally mounted and one projecting end engages the inner side of the lock lug, and the lever is then sprung in locked position by rotating it on its pivot until it clicks down on the lock lug, and by reason of this construction when in this position the lock lever is securely anchored against releasing until power is applied, the parts are securely locked, and it is obvious that the lug 18 is first inserted in the orific 13, and the flange 16 (by swinging the door from the pivot thus formed) clamped over the flange 12, completely surrounding same and making a close, tight joining therewith, before the members are locked together as above.

The front door, by construction and also of necessity as it must contain the glass for the front, is practically as large as the housing, and I also construct a large rear door, and thus my housing is practically a skeleton housing, readily and quickly closed to completely inclose the functioning parts. The orifice in the inner flange and the lug formed on the outer flange which engages the orifice and is seated therein obviously forms a hinge. If desired an ordinary hinge may be used in preference to the construction hereinbefore described.

Having thus described my invention what I claim and desire to secure by Letters Patent of the United States is:

1. A headlight housing comprising a body portion open at its rear and its front, and flanges surrounding each of said openings and an orifice in each flange; a closure door for each opening with a lug to engage the orifice in its respective flange; a lock lug on the body portion for each closure door; a lock lever pivotally mounted to an arm which is itself pivotally mounted to a lug on each of said doors, said lock levers being designed to engage their respective lock lugs and lock their respective closure doors to the body portion.

2. A headlight housing comprising a central barrel shaped body portion open at both ends; flanges surrounding each of said openings; an orifice substantially in the top portion of each flange; curved locking lugs on the body portion, substantially in the same plane with the orifices respectively; a closure door for each opening, provided with a flange to engage the corresponding flange of the body portion; and provided with a lug to engage its respective orifice; a lock lever pivotally mounted to an arm, which is itself pivotally mounted to a lug, on each of said doors; said lock levers being constructed to engage their respective curved lock lugs and lock their respective closure doors to the body portion.

In testimony whereof I have signed the foregoing specification.

WALTER D'ARCY RYAN.